United States Patent
Shin

(10) Patent No.: US 10,229,714 B1
(45) Date of Patent: Mar. 12, 2019

(54) APPARATUS AND USER DEVICE FOR PROVIDING TIME SLICE VIDEO

(71) Applicant: KT Corporation, Seongnam-si, Gyeonggi-do (KR)

(72) Inventor: Hyoung-Chul Shin, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/882,016

(22) Filed: Jan. 29, 2018

(51) Int. Cl.
| | |
|---|---|
| *H04N 5/77* | (2006.01) |
| *G11B 27/00* | (2006.01) |
| *H04N 5/93* | (2006.01) |
| *G11B 27/031* | (2006.01) |
| *G11B 27/34* | (2006.01) |
| *H04N 9/80* | (2006.01) |
| *H04N 5/783* | (2006.01) |

(52) U.S. Cl.
CPC ............ *G11B 27/031* (2013.01); *G11B 27/34* (2013.01); *H04N 5/77* (2013.01)

(58) Field of Classification Search
CPC .. H04N 5/77; H04N 5/93; H04N 9/80; H04N 5/783; G11B 27/00
USPC ................ 386/223, 224, 278, 280, 239, 348
See application file for complete search history.

(56) References Cited

U.S. PATENT DOCUMENTS

| | | | |
|---|---|---|---|
| 2014/0104376 A1* | 4/2014 | Chen ................ | G08B 13/19689 348/36 |
| 2014/0177942 A1* | 6/2014 | Luo .......................... | G06T 3/40 382/154 |

FOREIGN PATENT DOCUMENTS

| | | |
|---|---|---|
| JP | 2007133660 A | 5/2007 |
| KR | 1020070000994 A | 1/2007 |
| KR | 1020140121107 A | 10/2014 |

* cited by examiner

*Primary Examiner* — Daquan Zhao
(74) *Attorney, Agent, or Firm* — Brundidge & Stanger, P.C.

(57) ABSTRACT

A time slice video providing apparatus includes a video receiving unit configured to receive multiple videos recorded by multiple cameras, a selection unit configured to select a region of interest from at least one of the multiple videos, a coordinate restoring unit configured to restore multi-dimensional center coordinates based on the selected region of interest and positional relationship information between the multiple cameras, and a generation unit configured to extract each image from the multiple videos based on the restored multi-dimensional center coordinates and generate a time slice video using each of the extracted images.

16 Claims, 12 Drawing Sheets

FIG. 3
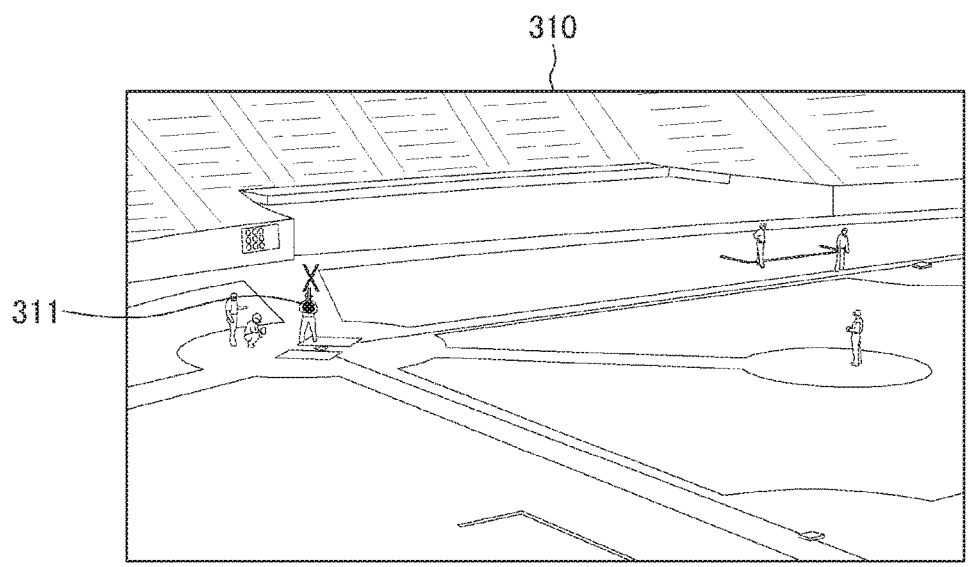
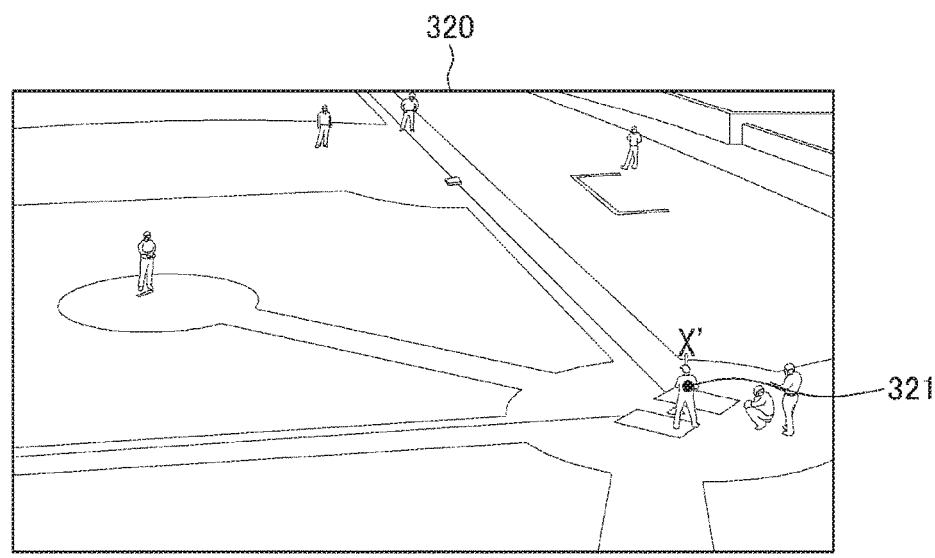

FIG. 4B
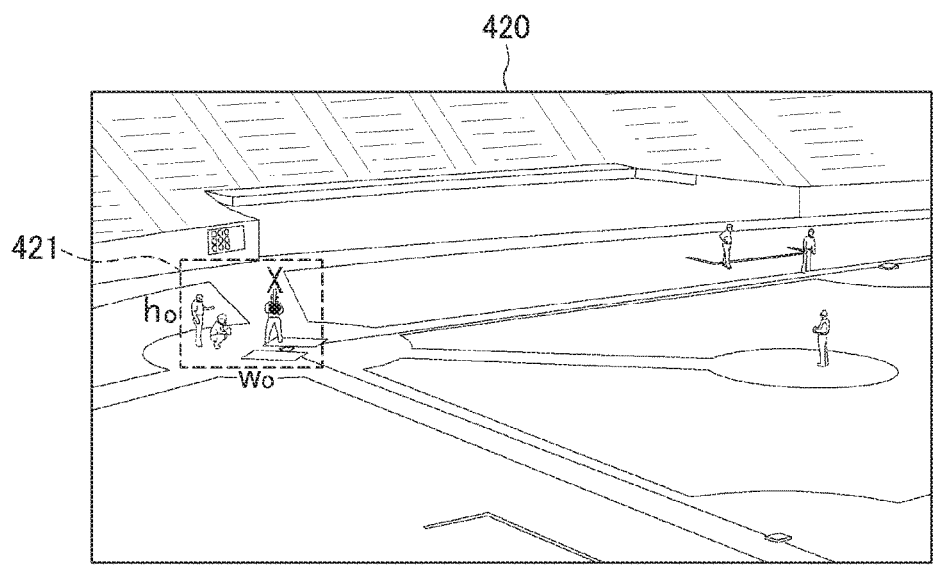
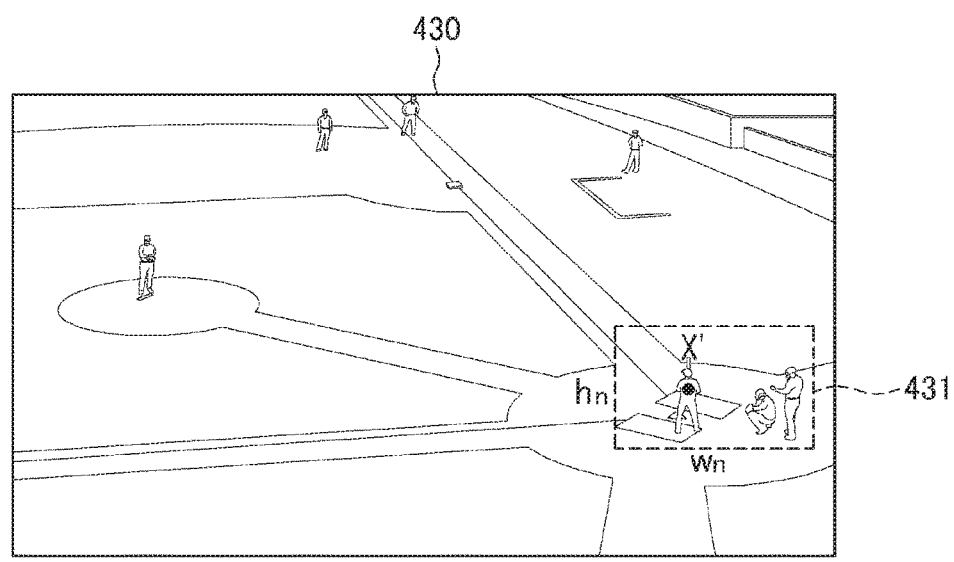

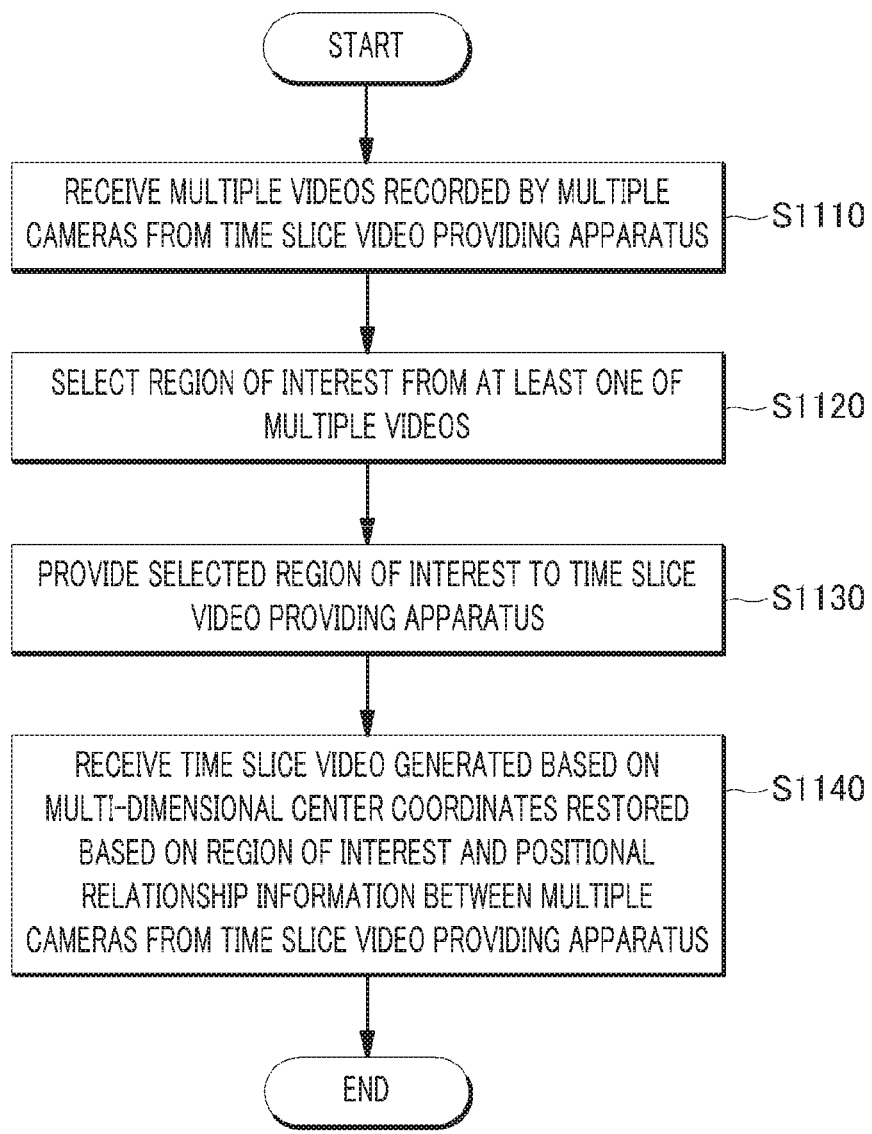

APPARATUS AND USER DEVICE FOR PROVIDING TIME SLICE VIDEO

TECHNICAL FIELD

The present disclosure relates to an apparatus and a user device for providing a time slice video.

BACKGROUND

Time slice technique refers to an imaging method in which multiple cameras are installed to face a subject from various angles and momentarily and simultaneously take photos of the subject and a computer is used to connect the photos, thereby making a standstill motion of the subject look as if captured with a movie camera. A time slice shows the subject in 3D and also provides a feel of transcending time and space.

In recent years, time slice videos have been provided during a sports broadcast. Thus, a multi-view detail image makes it possible to analyze and comment in detail about a sports game. However, as for a conventional sports broadcast, some imprecise time slice videos have been produced since a point where an event will occur needs to be previously selected by a time slice video producer. Further, during a sports game, events occur randomly. Therefore, it has been difficult to predict a point where an event will occur.

SUMMARY

In a sports game, event occurring points are randomly generated, and, thus, it has been difficult to set an area for event occurring points. In this regard, the present disclosure provides an apparatus and a user device capable of immediately performing such a process and thus providing a time slice video which can be applied to a sports game. Conventionally, it has been possible to generate a time slice video based on a traceable subject. In this regard, the present disclosure provides an apparatus and a user device capable of generating a time slice video based on a certain point and thus providing a time slice video with a high degree of freedom. The present disclosure provides an apparatus and a user device capable of providing an interactive time slice video by providing a time slice video of a certain area in response to selection by a user of the certain area. However, problems to be solved by the present disclosure are not limited to the above-described problems. There may be other problems to be solved by the present disclosure.

According to an exemplary embodiment of the present disclosure, A time slice video providing apparatus may include a video receiving unit configured to receive multiple videos recorded by multiple cameras, a selection unit configured to select a region of interest from at least one of the multiple videos, a coordinate restoring unit configured to restore multi-dimensional center coordinates based on the selected region of interest and positional relationship information between the multiple cameras, and a generation unit configured to extract each image from the multiple videos based on the restored multi-dimensional center coordinates and generate a time slice video using each of the extracted images.

According to another exemplary embodiment of the present disclosure, A time slice video providing apparatus may include a video transmitting unit configured to transmit multiple videos recorded by multiple cameras to a user device, a receipt unit configured to receive a region of interest selected among at least one of the multiple videos from the user device, a coordinate restoring unit configured to derive multi-dimensional center coordinates based on the selected region of interest and positional relationship information between the multiple cameras, a generation unit configured to extract each image from the multiple videos based on the restored multi-dimensional center coordinates and generate a time slice video using each of the extracted images, and a transmission unit configured to transmit the generated time slice video to the user device.

According to another exemplary embodiment of the present disclosure, A user device for providing a time slice video may include a video receiving unit configured to receive multiple videos recorded by multiple cameras from a time slice video providing apparatus, a selection unit configured to select a region of interest from at least one of the multiple videos, and a transmission unit configured to transmit the selected region of interest to the time slice video providing apparatus, wherein the video receiving unit receives a time slice video generated based on multi-dimensional center coordinates restored based on the region of interest and positional relationship information between the multiple cameras from the time slice video providing apparatus, each image is extracted from the multiple videos based on the restored multi-dimensional center coordinates, and the time slice video is generated using each of the extracted images.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described exemplary embodiments of the present disclosure, in a sports game, event occurring points are randomly generated, and, thus, it has been difficult to set an area for event occurring points. According to any one of the above-described exemplary embodiments of the present disclosure, it is possible to provide an apparatus and a user device capable of immediately performing such a process and thus providing a time slice video which can be applied to a sports game. Conventionally, it has been possible to generate a time slice video based on a traceable subject. According to any one of the above-described exemplary embodiments of the present disclosure, it is possible to provide an apparatus and a user device capable of generating a time slice video based on a certain point and thus providing a time slice video with a high degree of freedom. Further, it is possible to provide an apparatus and a user device capable of providing an interactive time slice video by providing a time slice video of a certain area in response to selection by a user of the certain area.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 shows exemplary diagrams provided to explain a process for selecting a region of interest from multiple videos according to an exemplary embodiment of the present disclosure.

FIG. 4A and FIG. 4B are exemplary diagrams provided to explain a process for setting a field of view by expanding a region from video center coordinates according to an exemplary embodiment of the present disclosure.

FIG. 11 is a flowchart showing a method of providing a time slice video by the user device according to an exemplary embodiment of the present disclosure.

DETAILED DESCRIPTION

Figure 1:
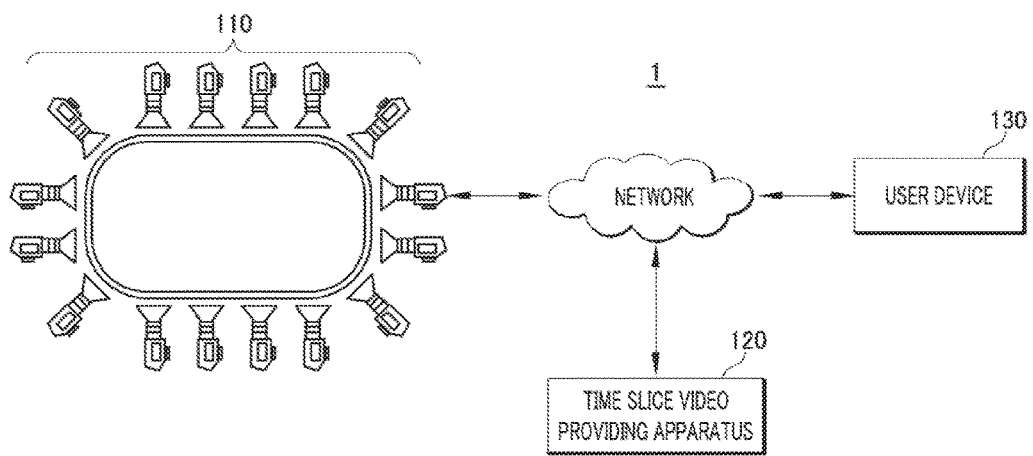
FIG. 1 is a configuration view illustrating a time slice video providing system according to an exemplary embodiment of the present disclosure.

Hereafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be carried out by a server connected to the terminal or device. Likewise, a part of an operation or function described as being carried out by a server may be carried out by a terminal or device connected to the server.

Hereafter, an exemplary embodiment of the present disclosure will be described in detail with reference to the accompanying drawings.

FIG. 1 is a configuration view illustrating a time slice video providing system according to an exemplary embodiment of the present disclosure. Referring to FIG. 1, a time slice video providing system 1 may include multiple cameras 110, a time slice video providing apparatus 120, and a user device 130. The multiple cameras 110, the time slice video providing apparatus 120, and the user device 130 are illustrated as exemplary components which can be controlled by the time slice video providing system 1.

The components of the time slice video providing system 1 illustrated in FIG. 1 are typically connected through a network. For example, as illustrated in FIG. 1, the time slice video providing apparatus 120 may be simultaneously or sequentially connected to the multiple cameras 110 and the user device 130.

The network refers to a connection structure that enables information exchange between nodes such as devices, servers, etc. Examples of the network may include 3G, 4G, 5G, Wi-Fi, Bluetooth, Internet, LAN (Local Area Network), Wireless LAN (Wireless Local Area Network), WAN (Wide Area Network), PAN (Personal Area Network), and the like, but are not limited thereto.

The multiple cameras 110 may record a video of a sports game or performance in a sports arena or theater and transmit the recorded video to the time slice video providing apparatus 120. For example, the multiple cameras 110 may be installed with a predetermined space therebetween in the sports arena or theater.

The time slice video providing apparatus 120 may receive the multiple recorded videos from the multiple cameras 110 and transmit the multiple received videos to the user device 130. The time slice video providing apparatus 120 may derive positional relationship information based on internal parameters and external parameters of the multiple cameras 110. The internal parameters may include focal lengths, image center values, and camera distortion values of the multiple cameras 110, and the external parameters may include position information relative to reference coordinates of the multiple cameras 110.

The time slice video providing apparatus 120 may select a region of interest from at least one of the multiple videos. For example, the time slice video providing apparatus 120 may receive a region of interest selected among at least one of the multiple videos from the user device 130 and thus select the region of interest. Specifically, the user device 130 selects a certain point from at least one of the multiple videos and sets the certain point as video center coordinates, so that the time slice video providing apparatus 120 can select a region of interest.

The time slice video providing apparatus 120 may restore multi-dimensional center coordinates based on the selected region of interest and positional relationship information between the multiple cameras 110. For example, if video center coordinates of at least two of the multiple videos are set, the time slice video providing apparatus 120 may restore multi-dimensional center coordinates based on the video center coordinates of the at least two videos and positional relationship information. For another example, if video center coordinates of one of the multiple videos are set, the time slice video providing apparatus 120 may restore a contact point between a straight line extended from a viewpoint of the camera corresponding to set video center coordinates to the set video center coordinates and an equation of a plane containing a certain point as multi-dimensional center coordinates based on positional relationship information. Further, if video center coordinates of one of the multiple videos are set, the time slice video providing apparatus 120 may restore multi-dimensional center coordinates by applying a depth value of a background containing a certain point to a straight line extended from a viewpoint of the camera corresponding to set video center coordinates to the set video center coordinates based on positional relationship information.

The time slice video providing apparatus 120 may extract projection coordinates from each of the multiple videos by projecting the restored multi-dimensional center coordinates to the multiple videos. In this case, the time slice video providing apparatus 120 may set a field of view by expanding a region from the set video center coordinates by additional input.

The time slice video providing apparatus 120 may extract each image from the multiple videos based on the restored multi-dimensional center coordinates and generate a time slice video using each of the extracted images. Further, the time slice video providing apparatus 120 may extract each image from the multiple videos based on the extracted projection coordinates and generate a time slice video using each of the extracted images. For example, the time slice video providing apparatus 120 may apply a field of view which is set based on the extracted projection coordinates to the multiple videos and extract an image corresponding to the applied field of view from the multiple videos. In this case, the time slice video providing apparatus 120 may correct the field of view set based on the extracted projection coordinates using the positional relationship information and apply the corrected field of view to the multiple videos.

The time slice video providing apparatus 120 may transmit the generated time slice video to the user device 130.

The user device 130 may receive multiple videos recorded by the multiple cameras 110 from the time slice video providing apparatus 120.

The user device 130 may receive selection of a region of interest from at least one of the multiple videos and transmit the selected region of interest to the time slice video providing apparatus 120. For example, the user device 130 may receive selection of a region of interest by receiving selection of a certain point from at least one of the multiple videos and setting the selected point as video center coordinates and transmit the selected region of interest to the time slice video providing apparatus 120.

The user device 130 may set a field of view by expanding a region from the set video center coordinates by additional input and transmit the set field of view to the time slice video providing apparatus 120. For example, the user device 130 may set a field of view by expanding to a region which is input by dragging from the set video center coordinates and to a region inverted thereto.

The user device 130 may receive a time slice video generated based on the multi-dimensional center coordinates restored based on the region of interest and the positional relationship information between the multiple cameras 110 from the time slice video providing apparatus 120.

Figure 2:
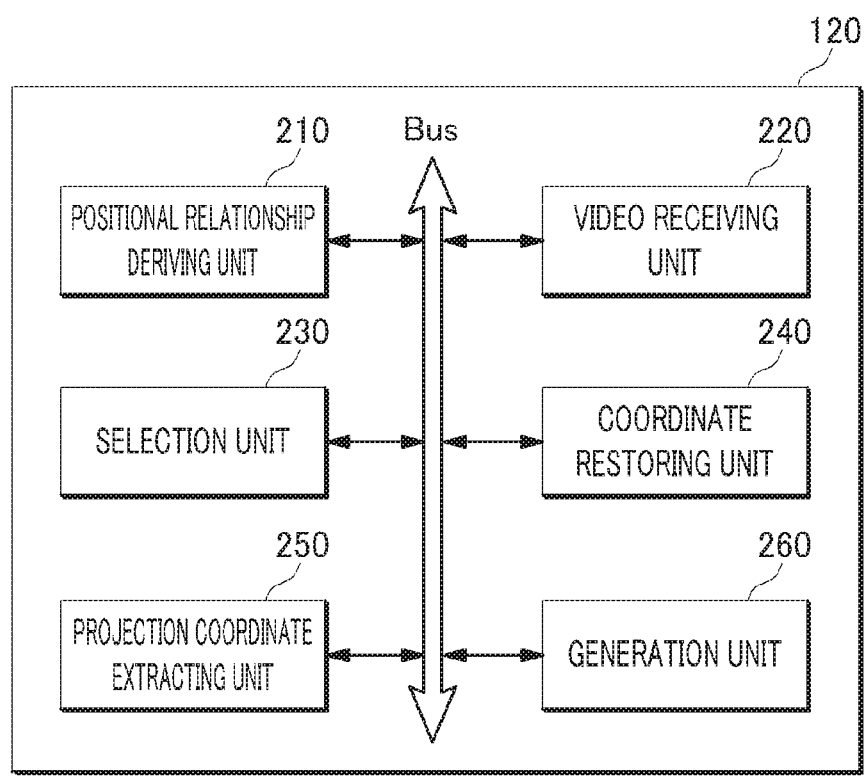
FIG. 2 is a configuration view illustrating a time slice video providing apparatus according to an exemplary embodiment of the present disclosure.

FIG. 2 is a configuration view illustrating a time slice video providing apparatus according to an exemplary embodiment of the present disclosure. Referring to FIG. 2, the time slice video providing apparatus 120 may include a positional relationship deriving unit 210, a video receiving unit 220, a selection unit 230, a coordinate restoring unit 240, a projection coordinate extracting unit 250, and a generation unit 260.

The positional relationship deriving unit 210 may derive positional relationship information based on the internal parameters and the external parameters of the multiple cameras 110. The internal parameters may include focal lengths, image center values, and camera distortion values of the multiple cameras 110, and the external parameters may include position information relative to reference coordinates of the multiple cameras 110. For example, if the multiple cameras 110 are installed in a sports arena, the positional relationship deriving unit 210 may derive the positional relationship information based on the internal parameters and the external parameters of the multiple cameras 110 using measurable geographic identifiers such as a corner or a touch line in the sports arena. For another example, the positional relationship deriving unit 210 may derive the positional relationship information based on the internal parameters and the external parameters of the multiple cameras 110 using Structure From Motion (SFM). The SFM refers to a technique to obtain 3D-structure information and camera motion in a screen from videos of different viewpoints.

The process for obtaining positional relationship information between the multiple cameras 110 is performed after the multiple cameras 110 are arranged in a sports arena or theater. If the multiple cameras 110 are changed in position, the process may be performed again to derive positional relationship information between the multiple cameras 110.

The video receiving unit 220 may receive multiple videos recorded by the multiple cameras 110.

The selection unit 230 may select a region of interest from at least one of the multiple videos. The selection unit 230 may select a certain point from at least one of the multiple videos and set the certain point as video center coordinates to select a region of interest. The certain point may be a point where a subject is located or a point where the subject is not located. Therefore, according to the present disclosure, there is no need to trace the subject to select a region of interest. That is, according to the present disclosure, the time slice video providing apparatus 120 can directly select a region of interest in response to a user's input.

The process for selecting a region of interest will be described in detail with reference to FIG. 3.

FIG. 3 shows exemplary diagrams provided to explain the process for selecting a region of interest from multiple videos according to an exemplary embodiment of the present disclosure. Referring to FIG. 3, a region of interest may be selected from multiple videos to generate a time slice video of a baseball game.

For example, in order to generate a time slice video of a baseball game, the selection unit 230 may select a certain point 311 for a batter at bat from a first video 310 among the multiple videos and set the selected point as video center coordinates X to select a region of interest. Further, the selection unit 230 may select a certain point 321 for a batter at bat from a second video 320 among the multiple videos and set the selected point as video center coordinates X' to select a region of interest.

Returning to FIG. 2 again, the selection unit 230 may set a field of view by expanding a region from the set video center coordinates by additional input. For example, the field of view may be set by expanding to a region which is input by dragging from the set video center coordinates through the user device 130 and to a region inverted thereto. The process for setting a field of view by expanding a region from video center coordinates will be described in detail with reference to FIG. 4A and FIG. 4B.

Figure 4A:
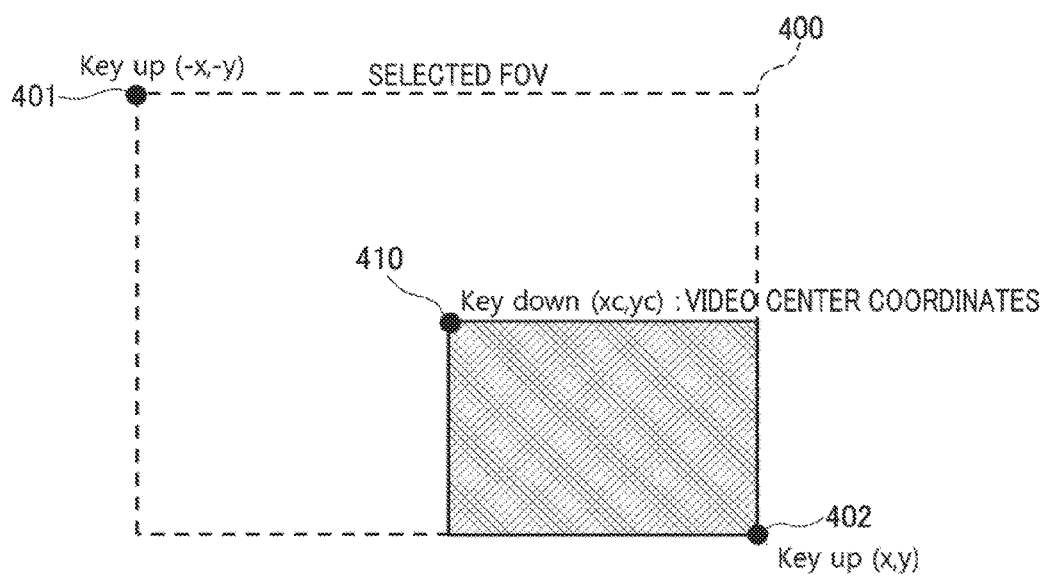

FIG. 4A and FIG. 4B are exemplary diagrams provided to explain the process for setting a field of view by expanding a region from video center coordinates according to an exemplary embodiment of the present disclosure.

FIG. 4A is an exemplary diagram provided to explain the process for setting a field of view according to an exemplary embodiment of the present disclosure. Referring to FIG. 4A, if the selection unit 230 selects a certain point from at least one of the multiple videos, video center coordinates for the selected point can be set. The video center coordinates may correspond to (xc, yc) coordinates 410 in a "key down".

The selection unit 230 may select a region of interest based on the selected video center coordinates. The region of interest may include, for example, a region ranging from (xc, yc) coordinates 410 in the "key down" to (x, y) coordinates 402 in a "key up" and a region corresponding to (−x, −y) coordinates 401 in the "key up" which are inverted from the (x, y) coordinates 402 in the "key up".

In this case, if dragging is input through the user device 130, video center coordinates and a field of view may be set simultaneously. For example, if dragging is input through the user device 130, a field of view 400 ranging from the (−x, −y) coordinates 401 in the "key up" to the (x, y) coordinates 402 in the "key up" may be set simultaneously with the video center coordinates 410.

FIG. 4B shows exemplary diagrams illustrating multiple videos in which a field of view is set according to an exemplary embodiment of the present disclosure. Referring to FIG. 4B, a first field of view 421 may be set for a first certain point X selected from a first video 420, and a second field of view 431 may be set for a second certain point X' selected from a second video 430.

In the first video 420, the width and the height of the field of view may be set to "w0" and "h0", respectively, and in the second video 430, the width and the height of the field of view may be set to "wn" and "hn", respectively.

An aspect ratio of an original video is maintained in a field of view, and the size of a field of view of an intermediate video (width: wk, height: hk) between the first video 420 and the second video 430 may be linearly interpolated based on Equation 1.

$$w_k = \frac{(w_0 * (n-k) + w_n * k)}{n}$$  [Equation 1]

$$h_k = \frac{h_0 * (n-k) + h_n * k}{n}$$

Returning to FIG. 2 again, the coordinate restoring unit 240 may restore multi-dimensional center coordinates based on the selected region of interest and positional relationship information between the multiple cameras 110. The coordinate restoring unit 240 may variously restore multi-dimensional center coordinates depending on the number of videos in which video center coordinates are set from among the multiple videos. The process for variously restoring multi-dimensional center coordinates depending on the number of videos in which video center coordinates are set will be described in detail with reference to FIG. 5A and FIG. 5B.

Figure 5A:
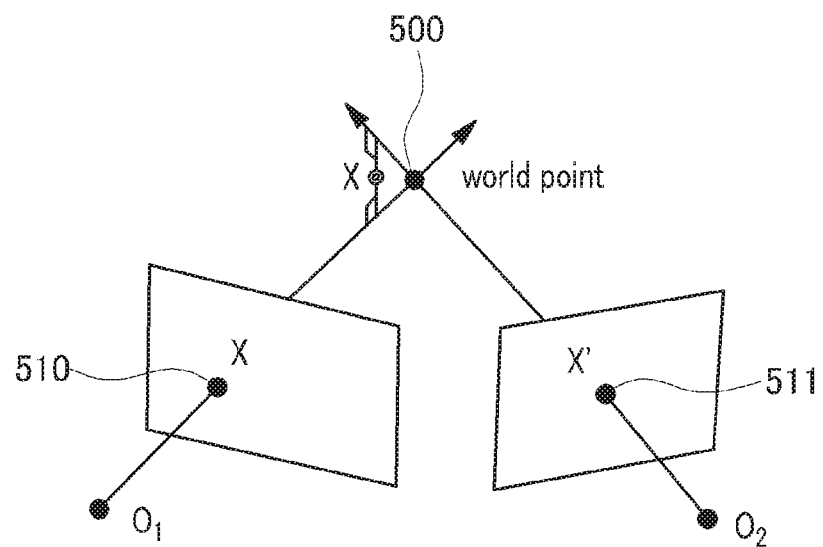
FIG. 5A and FIG. 5B are exemplary diagrams provided to explain a process for restoring multi-dimensional center coordinates according to an exemplary embodiment of the present disclosure.
Figure 5B:
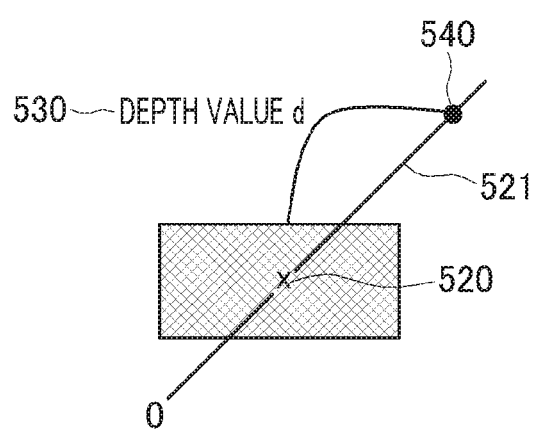

FIG. 5A and FIG. 5B are exemplary diagrams provided to explain the process for restoring multi-dimensional center coordinates according to an exemplary embodiment of the present disclosure.

FIG. 5A is an exemplary diagram provided to explain the process for restoring multi-dimensional center coordinates in the case where video center coordinates are set in at least two of the multiple videos according to an exemplary embodiment of the present disclosure. Referring to FIG. 5A, if video center coordinates are set in at least two of the multiple videos, the coordinate restoring unit 240 may linearly restore multi-dimensional center coordinates based on the video center coordinates of the at least two videos and positional relationship information.

For example, if video center coordinates are set in two videos, the coordinate restoring unit 240 may linearly restore multi-dimensional center coordinates 500 through triangulation from X 510 and X' 511 of the two video center coordinates based on positional relationship information.

FIG. 5B is an exemplary diagram provided to explain the process for restoring multi-dimensional center coordinates in the case where video center coordinates are set in one of the multiple videos according to an exemplary embodiment of the present disclosure. Referring to FIG. 5B, if video center coordinates are set in one of the multiple videos, the coordinate restoring unit 240 may restore a contact point 540 between a straight line 521 extended from a viewpoint of a camera corresponding to set video center coordinates 520 to the set video center coordinates 520 and an equation of a plane containing a certain point 520 as multi-dimensional center coordinates based on positional relationship information.

For example, the coordinate restoring unit 240 may restore the multi-dimensional center coordinates 540 by applying a depth value 530 of a background containing a certain point to the straight line 521 extended from the viewpoint of the camera corresponding to set video center coordinates 520 to the set video center coordinates 520 based on positional relationship information. Herein, the depth value of the background may be previously calculated.

Returning to FIG. 2 again, the projection coordinate extracting unit 250 may extract projection coordinates from each of the multiple videos by projecting the restored multi-dimensional center coordinates to the multiple videos. The projection coordinate extracting unit 250 may extract projection coordinates by projecting the restored multi-dimensional center coordinates to each of the multiple videos of different viewpoints.

The generation unit 260 may extract each image from the multiple videos based on the restored multi-dimensional center coordinates and generate a time slice video using each of the extracted images. The generation unit 260 may extract each image from the multiple videos based on the projection coordinates extracted by the projection coordinate extracting unit 250 and generate a time slice video using each of the extracted images. The process for generating a time slice image based on projection coordinates will be described in detail with reference to FIG. 6.

Figure 6:
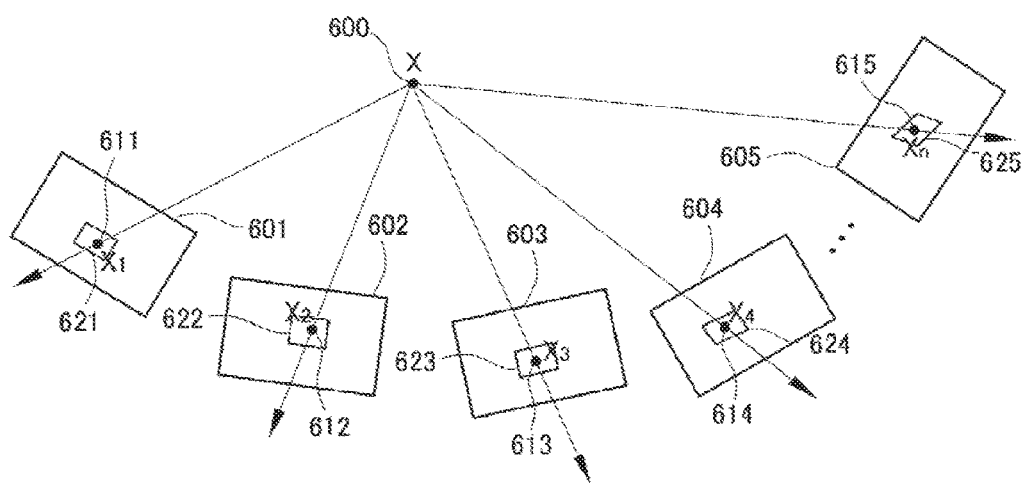
FIG. 6 is an exemplary diagram provided to explain a process for generating a time slice video by extracting images based on projection coordinates according to an exemplary embodiment of the present disclosure.

FIG. 6 is an exemplary diagram provided to explain the process for generating a time slice video by extracting images based on projection coordinates according to an exemplary embodiment of the present disclosure. Referring to FIG. 6, the projection coordinate extracting unit 250 may extract projection coordinates 611 to 615 from multiple videos 601 to 605, respectively, by projecting restored multi-dimensional center coordinates (X) 600 to the multiple videos 601 to 605.

The generation unit 260 may apply fields of view 621 to 625 set based on the extracted projection coordinates 611 to 615 to the multiple videos and extract images corresponding to the applied fields of view 621 to 625 from the multiple videos to generate a time slice video. In this case, the generation unit 260 may correct the fields of view 621 to 625 set based on the extracted projection coordinates 611 to 615 using the positional relationship information and apply the corrected fields of view to the multiple videos.

Since the multi-dimensional center coordinates are projected to the multiple videos, the time slice video generated as described above is not blurry and can be projected to an untraceable and covered position.

Figure 7:
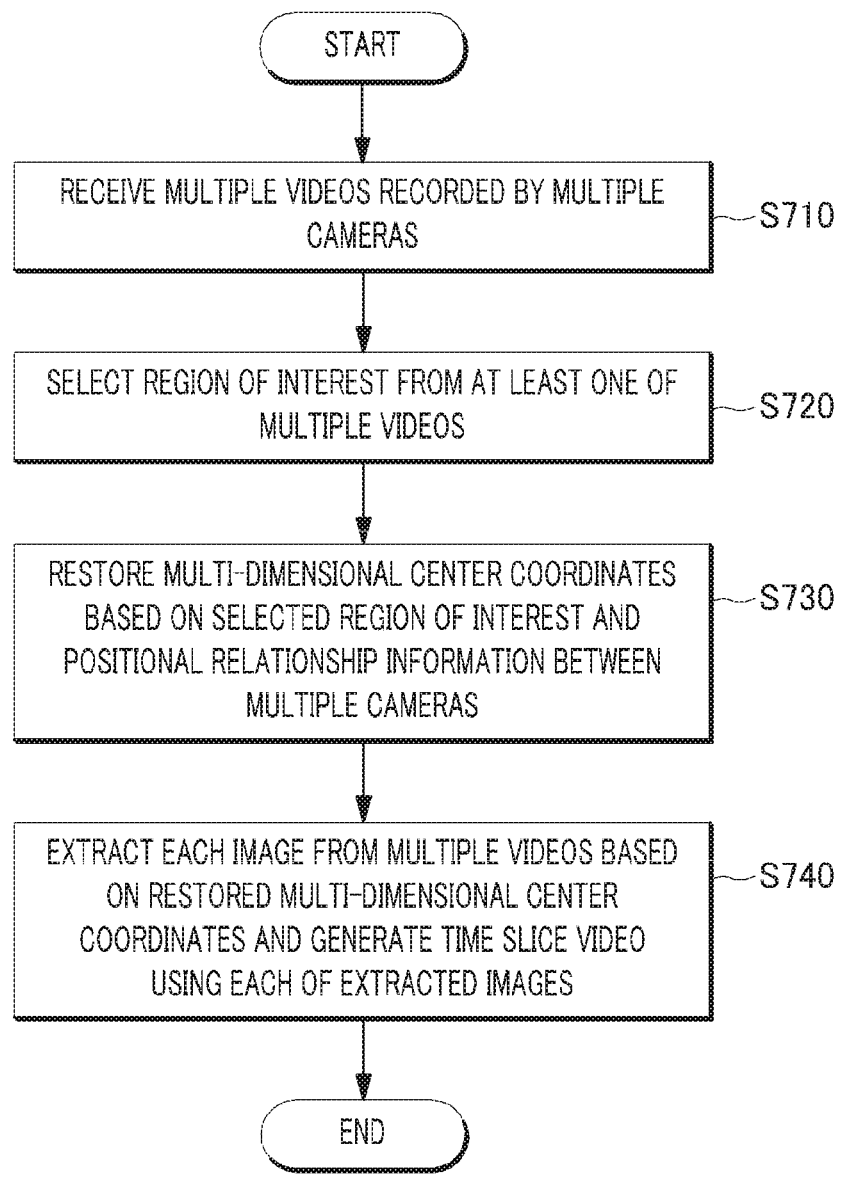
FIG. 7 is a flowchart showing a method of providing a time slice video by the time slice video providing apparatus according to an exemplary embodiment of the present disclosure.

FIG. 7 is a flowchart showing a method of providing a time slice video by the time slice video providing apparatus according to an exemplary embodiment of the present disclosure. A method of providing a time slice video which is performed by the time slice video providing apparatus 120 illustrated in FIG. 7 includes the processes time-sequentially performed by the time slice video providing system 1 according to the exemplary embodiment illustrated in FIG. 1 to FIG. 6. Therefore, descriptions of the processes performed by the time slice video providing system 1 may be applied to the method of providing a time slice video by the time slice video providing apparatus 120 according to the exemplary embodiment illustrated in FIG. 1 to FIG. 6, even though they are omitted hereinafter.

In a process S710, the time slice video providing apparatus 120 may receive multiple videos recorded by the multiple cameras 110.

In a process S720, the time slice video providing apparatus 120 may select a region of interest from at least one of the multiple videos.

In a process S730, the time slice video providing apparatus 120 may restore multi-dimensional center coordinates based on the selected region of interest and positional relationship information between the multiple cameras 110.

In a process S740, the time slice video providing apparatus 120 may extract each image from the multiple videos based on the restored multi-dimensional center coordinates and generate a time slice video using each of the extracted images.

In the descriptions above, the processes S710 to S740 may be divided into additional processes or combined into fewer processes depending on an exemplary embodiment. In addition, some of the processes may be omitted and the sequence of the processes may be changed if necessary.

Figure 8:
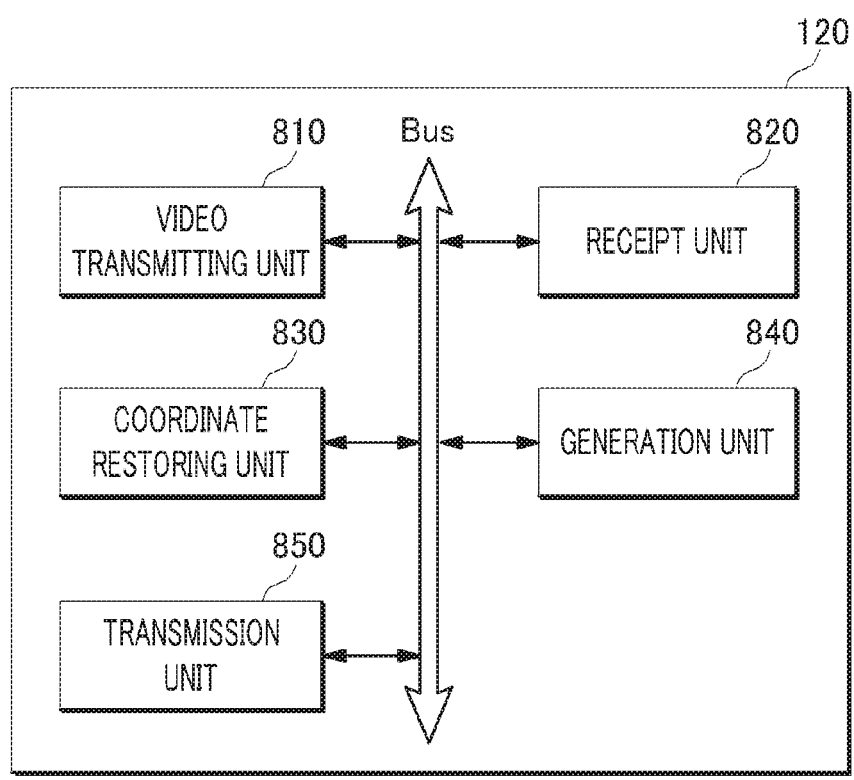
FIG. 8 is a configuration view illustrating a time slice video providing apparatus according to another exemplary embodiment of the present disclosure.

FIG. 8 is a configuration view illustrating a time slice video providing apparatus according to another exemplary embodiment of the present disclosure. Referring to FIG. 8, the time slice video providing apparatus 120 may include a video transmitting unit 810, a receipt unit 820, a coordinate restoring unit 830, a generation unit 840, and a transmission unit 850.

The video transmitting unit 810 may transmit multiple videos recorded by the multiple cameras 110 to the user device 130.

The receipt unit 820 may receive a region of interest selected among at least one of the multiple videos from the user device 130. For example, the region of interest may refer to a region which is input by dragging from set video center coordinates through the user device 130. That is, according to an exemplary embodiment of the present disclosure, the time slice video providing apparatus 120 can receive a region of interest from the user device 130 without directly selecting the region of interest.

The coordinate restoring unit 830 may derive multi-dimensional center coordinates based on the selected region of interest and positional relationship information between the multiple cameras 110.

The generation unit 840 may extract each image from the multiple videos based on the restored multi-dimensional center coordinates and generate a time slice video using each of the extracted images.

The transmission unit 850 may transmit the generated time slice video to the user device 130.

Figure 9:
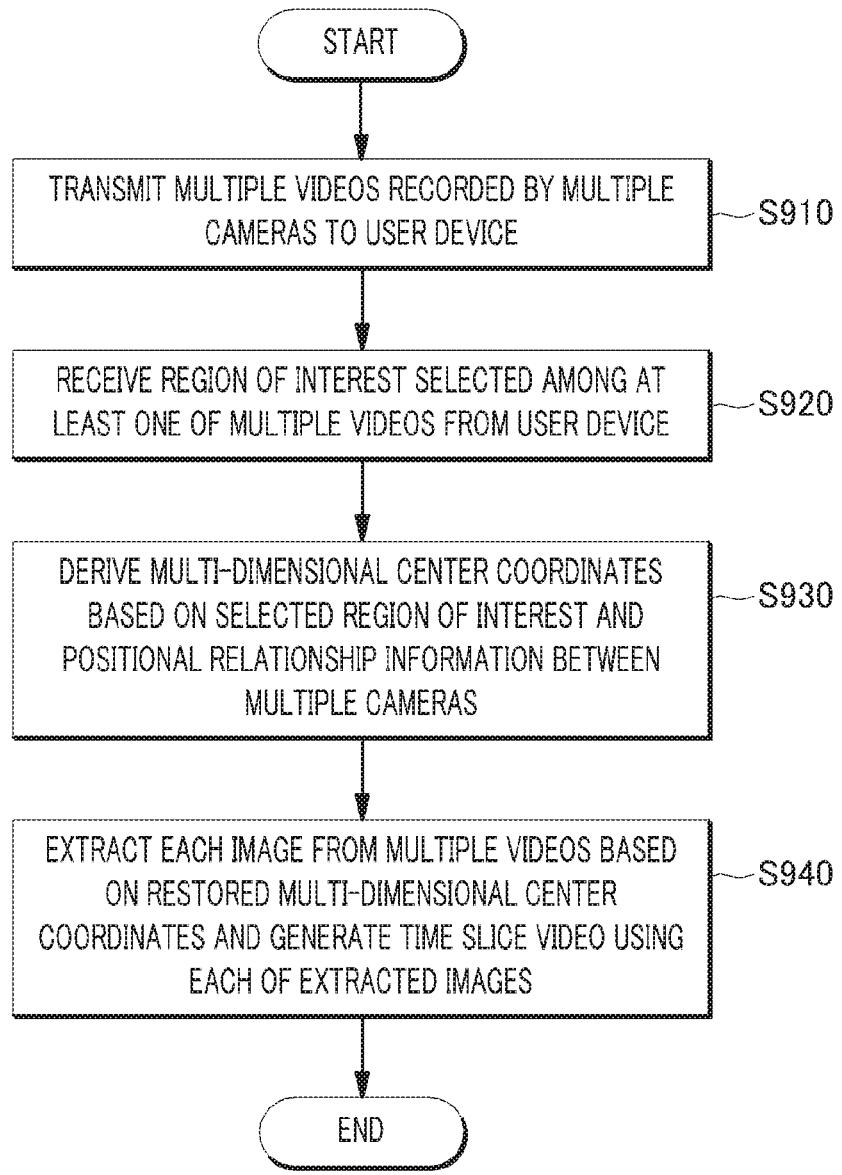
FIG. 9 is a flowchart showing a method of providing a time slice video by the time slice video providing apparatus according to another exemplary embodiment of the present disclosure.

FIG. 9 is a flowchart showing a method of providing a time slice video by the time slice video providing apparatus according to another exemplary embodiment of the present disclosure. A method of providing a time slice video which is performed by the time slice video providing apparatus 120 according to the exemplary embodiment illustrated in FIG. 9 includes the processes time-sequentially performed by the time slice video providing system 1 according to the exemplary embodiment illustrated in FIG. 1 to FIG. 8. Therefore, descriptions of the processes performed by the time slice video providing system 1 may be applied to the method of providing a time slice video by the time slice video providing apparatus 120 according to the exemplary embodiment illustrated in FIG. 1 to FIG. 8, even though they are omitted hereinafter.

In a process S910, the time slice video providing apparatus 120 may transmit multiple videos recorded by the multiple cameras 110 to the user device 130.

In a process S920, the time slice video providing apparatus 120 may receive a region of interest selected among at least one of the multiple videos from the user device 130.

In a process S930, the time slice video providing apparatus 120 may derive multi-dimensional center coordinates based on the selected region of interest and positional relationship information between the multiple cameras 110.

In a process S940, the time slice video providing apparatus 120 may extract each image from the multiple videos based on the restored multi-dimensional center coordinates and generate a time slice video using each of the extracted images.

In a process S950, the time slice video providing apparatus 120 may transmit the generated time slice video to the user device 130.

In the descriptions above, the processes S910 to S950 may be divided into additional processes or combined into fewer processes depending on an exemplary embodiment. In addition, some of the processes may be omitted and the sequence of the processes may be changed if necessary.

Figure 10:
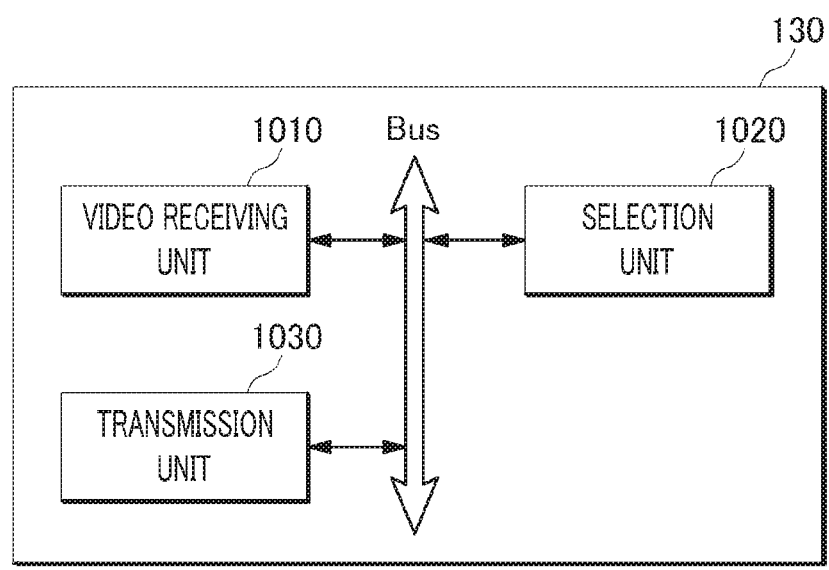
FIG. 10 is a configuration view illustrating a user device according to an exemplary embodiment of the present disclosure.

FIG. 10 is a configuration view illustrating a user device according to an exemplary embodiment of the present disclosure. Referring to FIG. 10, the user device 130 may include a video receiving unit 1010, a selection unit 1020, and a transmission unit 1030.

The video receiving unit 1010 may receive multiple videos recorded by the multiple cameras 110 from the time slice video providing apparatus 120. Further, the video receiving unit 1010 may receive a time slice video generated based on multi-dimensional center coordinates restored based on a region of interest and positional relationship information between the multiple cameras 110 from the time slice video providing apparatus 120.

The selection unit 1020 may receive selection of a region of interest from at least one of the multiple videos. For example, the selection unit 1020 may receive selection of a region of interest by receiving selection of a certain point from at least one of the multiple videos and setting the selected point as video center coordinates.

The selection unit 1020 may set a field of view by expanding a region from the set video center coordinates by additional input. For example, the selection unit 1020 may set a field of view by expanding to a region which is input by dragging from the set video center coordinates and to a region inverted thereto.

The transmission unit 1030 may transmit the selected region of interest to the time slice video providing apparatus 120.

Meanwhile, the user device 130 may further include, if necessary, a generation unit that generates a time slice video based on a region of interest selected by the user without interworking with the time slice video providing apparatus 120.

FIG. 11 is a flowchart showing a method of providing a time slice video by the user device according to an exemplary embodiment of the present disclosure. A method of providing a time slice video which is performed by the user device 130 according to the exemplary embodiment illustrated in FIG. 11 includes the processes time-sequentially performed by the time slice video providing system 1 according to the exemplary embodiment illustrated in FIG. 1 to FIG. 10. Therefore, descriptions of the processes performed by the time slice video providing system 1 may be applied to the method of providing a time slice video by the user device 130 according to the exemplary embodiment illustrated in FIG. 1 to FIG. 10, even though they are omitted hereinafter.

In a process S1110, the user device 130 may receive multiple videos recorded by the multiple cameras 110 from the time slice video providing apparatus 120.

In a process S1120, the user device 130 may receive selection of a region of interest from at least one of the multiple videos.

In a process S1130, the user device 130 may transmit the selected region of interest to the time slice video providing apparatus 120.

In a process S1140, the user device 130 may receive a time slice video generated based on multi-dimensional center coordinates restored based on the region of interest and positional relationship information between the multiple cameras 110 from the time slice video providing apparatus 120.

In the descriptions above, the processes S1110 to S1140 may be divided into additional processes or combined into fewer processes depending on an exemplary embodiment. In addition, some of the processes may be omitted and the sequence of the processes may be changed if necessary.

The method for providing a time slice video by the apparatus and the user device described above with reference to FIG. 1 to FIG. 11 can be implemented in a computer program stored in a medium to be executed by a computer or a storage medium including instructions codes executable by a computer. Also, method for providing a time slice video by the apparatus and the user device described above with reference to FIG. 1 to FIG. 11 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

110: multiple cameras
120: time slice video providing apparatus
130: user device
210: positional relationship deriving unit
220: video receiving unit
230: selection unit
240: coordinate restoring unit
250: projection coordinate extracting unit
260: generation unit
810: video transmitting unit
820: receipt unit
830: coordinate restoring unit
840: generation unit
850: transmission unit
1010: video receiving unit
1020: selection unit
1030: transmission unit

I claim:

1. A time slice video providing apparatus, comprising:
    a video receiving unit configured to receive multiple videos recorded by multiple cameras;
    a selection unit configured to select a region of interest from at least one of the multiple videos;
    a coordinate restoring unit configured to restore multi-dimensional center coordinates based on the selected region of interest and positional relationship information between the multiple cameras; and
    a generation unit configured to extract each image from the multiple videos based on the restored multi-dimensional center coordinates and generate a time slice video using each of the extracted images.

2. The time slice video providing apparatus of claim 1, further comprising:
    a positional relationship deriving unit configured to derive the positional relationship information based on an internal parameter and an external parameter of the multiple cameras.

3. The time slice video providing apparatus of claim 2, wherein the internal parameters include focal lengths, image center values, and camera distortion values of the multiple cameras, and
    the external parameters include position information relative to reference coordinates of the multiple cameras.

4. The time slice video providing apparatus of claim 3, wherein the selection unit selects a certain point from at least one of the multiple videos and selects the region of interest by setting the certain point as video center coordinates.

5. The time slice video providing apparatus of claim 4, wherein if video center coordinates are set in at least two of the multiple videos, the coordinate restoring unit restores the multi-dimensional center coordinates based on at least two video center coordinates and the positional relationship information.

6. The time slice video providing apparatus of claim 5, wherein if video center coordinates of one of the multiple videos are set, the coordinate restoring unit restores a contact point between a straight line extended from a viewpoint of a camera corresponding to the set video center coordinates to the set video center coordinates and an equation of a plane containing the certain point as multi-dimensional center coordinates based on the positional relationship information.

7. The time slice video providing apparatus of claim 5, wherein if video center coordinates of one of the multiple videos are set, the coordinate restoring unit restores the multi-dimensional center coordinates by applying a depth value of a background containing the certain point to a straight line extended from a viewpoint of a camera corresponding to the set video center coordinates to the set video center coordinates based on positional relationship information.

8. The time slice video providing apparatus of claim 4, further comprising:
a projection coordinate extracting unit configured to extract projection coordinates from each of the multiple videos by projecting the restored multi-dimensional center coordinates to the multiple videos,
wherein the generation unit extracts each image from the multiple videos based on the extracted projection coordinates and generates a time slice video using each of the extracted images.

9. The time slice video providing apparatus of claim 8, wherein the selection unit sets a field of view by expanding a region from the set video center coordinates by additional input.

10. The time slice video providing apparatus of claim 9, wherein the generation unit applies the set field of view to the multiple videos based on the extracted projection coordinates and extracts each image corresponding to the applied field of view from the multiple videos.

11. The time slice video providing apparatus of claim 10, wherein the generation unit corrects the set field of view based on the extracted projection coordinates using the positional relationship information and applies the corrected field of view to the multiple videos.

12. A time slice video providing apparatus, comprising:
a video transmitting unit configured to transmit multiple videos recorded by multiple cameras to a user device;
a receipt unit configured to receive a region of interest selected among at least one of the multiple videos from the user device;
a coordinate restoring unit configured to derive multi-dimensional center coordinates based on the selected region of interest and positional relationship information between the multiple cameras;
a generation unit configured to extract each image from the multiple videos based on the restored multi-dimensional center coordinates and generate a time slice video using each of the extracted images; and
a transmission unit configured to transmit the generated time slice video to the user device.

13. A user device for providing a time slice video, comprising:
a video receiving unit configured to receive multiple videos recorded by multiple cameras from a time slice video providing apparatus;
a selection unit configured to select a region of interest from at least one of the multiple videos; and
a transmission unit configured to transmit the selected region of interest to the time slice video providing apparatus,
wherein the video receiving unit receives a time slice video generated based on multi-dimensional center coordinates restored based on the region of interest and positional relationship information between the multiple cameras from the time slice video providing apparatus,
each image is extracted from the multiple videos based on the restored multi-dimensional center coordinates, and
the time slice video is generated using each of the extracted images.

14. The user device of claim 13, wherein the selection unit selects the region of interest by selecting a certain point from at least one of the multiple videos and setting the selected point as video center coordinates.

15. The user device of claim 14, wherein the selection unit sets a field of view by expanding a region from the set video center coordinates by additional input.

16. The user device of claim 15, wherein the selection unit sets a field of view by expanding to a region which is input by dragging from the set video center coordinates and to a region inverted thereto.

* * * * *